3 Sheets—Sheet 3.
J. J. MORRIS.
Carriage
No. 57,548. Patented Aug. 28, 1866
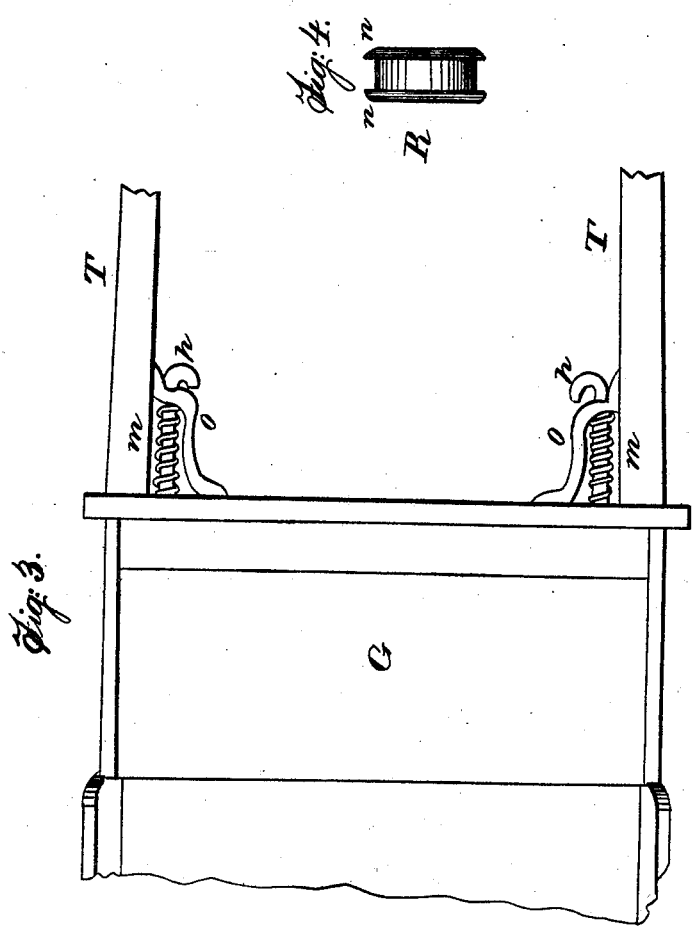
Witnesses.
L. L. Bond
O. T. Dodge
Inventor:
J. J. Morris
By W. E. Dodge
Attorney.

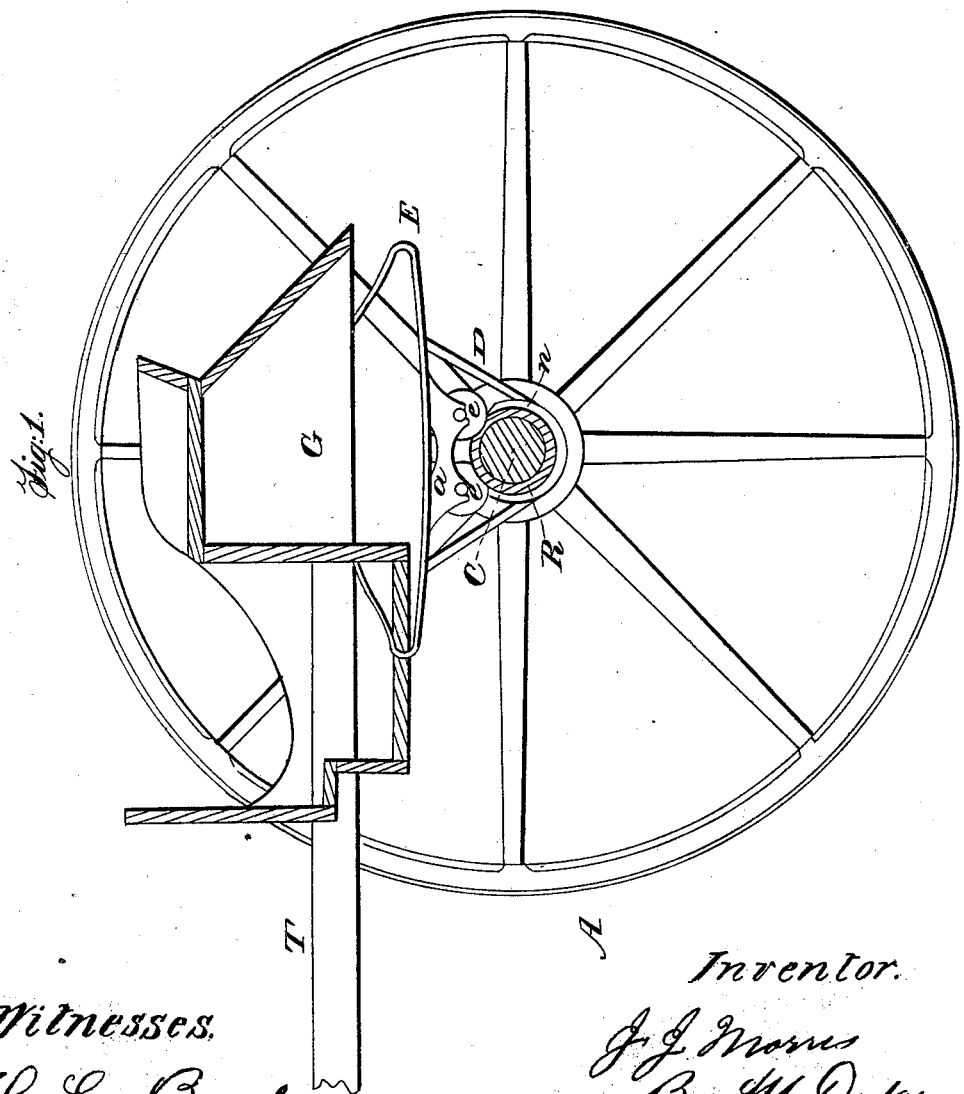

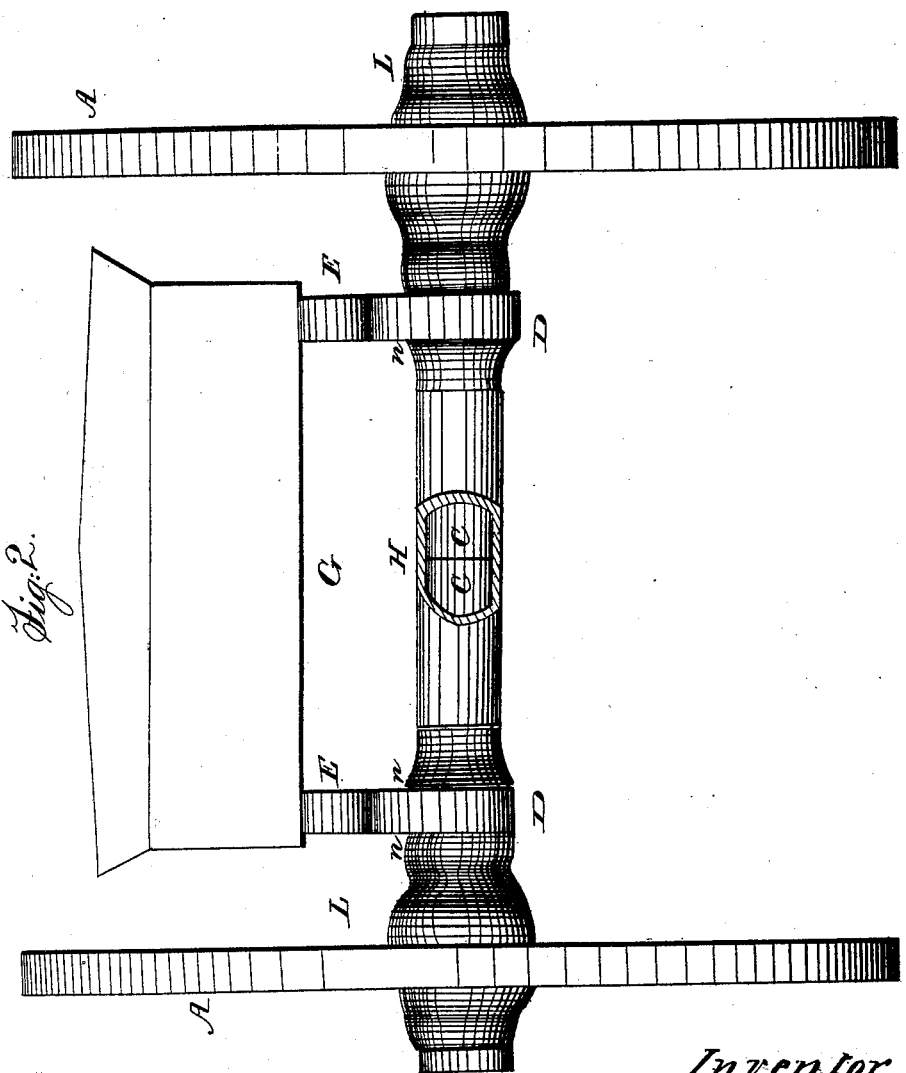

UNITED STATES PATENT OFFICE.

J. J. MORRIS, OF NEW BEDFORD, NEW JERSEY.

IMPROVEMENT IN CARRIAGES.

Specification forming part of Letters Patent No. 57,548, dated August 28, 1866.

*To all whom it may concern:*

Be it known that I, J. J. MORRIS, of New Bedford, in the county of Monmouth and State of New Jersey, have invented certain new and useful Improvements in the Running-Gear of Wagons; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in making the axle and hub all in one piece, each wheel having an independent axle that turns with the wheel, and in a novel manner of attaching the body of the vehicle to the axle. It also consists in the substitution of spring-hooks for the whiffletree.

Figure 1 is a longitudinal vertical section of a sulky with my improvements applied. Fig. 2 is a rear elevation of the same. Fig. 3 is a top-plan view of a portion of the same.

As wagons and similar vehicles are usually constructed, much time and labor is required to bore the hub, set the boxes, and fit the axle, and this requires great care in order to have the wheel run perfectly true. In order to avoid all this I construct the hub L of the wheel A and the half of the axle C of a single solid piece of wood or other suitable material, the part attached to each wheel extending to the center of the vehicle, as shown in Fig. 2. These two parts are turned perfectly round and straight, and when in position are placed end to end, and are held in that position by the sleeve H, which may be attached permanently to one portion of the axle while it is left loose upon the other, so as to permit each wheel, with its axle, to turn independent of the other, as is necessary in turning around.

A metal frame, *a*, is secured to the under side of the body of the vehicle, or to the spring E, if springs be used, as shown, in Fig. 1; and in this frame *a* are mounted two friction-rollers, *e*, which rest upon the axle, being secured by a strap, D, which encircles the axle, as shown.

A metal ring, R, having projecting flanges *n* on each side, as shown in Fig. 4, is secured to the axle C at the proper point for the friction-rollers *e* to rest upon it, the periphery of the rollers *e* at the point of contact resting in the groove formed by the flanges *n*, the strap D serving to hold them in place.

To avoid the use of a whiffletree I form the brace *o*, which is located at the junction of the shafts T with the body G of the vehicle, in the manner shown in Fig. 3. I then insert through a hole in the front part of the brace a hook, *h*, and place thereon a spiral spring, *m*, as shown. When the trace or tug strap is attached to the hook *h* the spring will yield sufficient to permit the necessary play to accommodate the animal's motions. It is obvious that when the tug is drawn tight, so as to pull the hook forward, it cannot become unhooked, and when there is no strain on it, the spring will draw the end of the hook back against the brace, and thus prevent the trace from becoming unhooked.

By this means I avoid the use of a whiffletree, and at the same time the yielding of the spring relieves the animal from the sudden jerks usual when the wheel strikes a stone or other obstacle. This is more especially adapted to single vehicles, though they may be used on double vehicles by attaching them to an evener to compensate for the unequal movements of the animals.

Having thus described my invention, what I claim is—

1. The independent axle C, having the hub and wheel attached permanently thereto, and revolving with the wheel, substantially as set forth.

2. The independent axles, constructed as set forth, in combination with the sleeve H, when arranged to operate as shown and described.

3. In combination with the axles C, as described, the friction-rollers *a*, arranged and operating as set forth.

4. The combination of the brace *o*, hook *h*, and spring *m*, when said parts are arranged in connection with the vehicle as shown and described.

J. J. MORRIS.

Witnesses:
H. C. DODGE,
JOHN BLACKIE.